United States Patent
Block et al.

[15] 3,663,274
[45] May 16, 1972

[54] METHOD OF MINIMIZING ACCUMULATION OF ELECTROSTATIC CHARGE ON POLYETHYLENE

[72] Inventors: Burton P. Block, Wayne; Oliver S. Sprout, Jr., Glenside; Gerd H. Dahl, King of Prussia, all of Pa.

[73] Assignee: The United States of America as represented by the Secretary of the Navy

[22] Filed: June 3, 1970

[21] Appl. No.: 43,178

[52] U.S. Cl.........117/138.8 E, 117/138.8 A, 117/139.5 CQ, 252/8.6
[51] Int. Cl. .................................B32b 27/32, D06m 15/62
[58] Field of Search............117/139.5 CQ, 138.8 E, 138.8 B; 252/8.6; 260/429.3, 438.5 R

[56] References Cited

UNITED STATES PATENTS

| | | | |
|---|---|---|---|
| 3,444,103 | 5/1969 | Maguire | 260/438.5 R |
| 3,449,367 | 6/1969 | King et al. | 260/438.5 R |
| 3,270,005 | 8/1966 | Ingram | 117/139.5 CQ X |
| 2,286,794 | 6/1942 | Dickey et al. | 252/8.6 X |
| 3,377,181 | 4/1968 | Kamijo et al. | 117/139.5 CQ X |
| 2,726,256 | 12/1955 | Morris et al. | 117/139.5 CQ |
| 2,945,774 | 7/1960 | Waitkus | 117/139.5 CQ |

*Primary Examiner*—William D. Martin
*Assistant Examiner*—Ralph Husack
*Attorney*—R. S. Sciascia and A. W. Collins

[57] ABSTRACT

Subject disclosure relates to the use of poly (metal phosphinates) as electrostatic discharge agents on polyethylene and other polymeric surface materials. More specifically, zirconium dihydroxy dibutylphosphinate dioctylphosphinate and chromium aquo hydroxy dibutylphosphinate and/or chromium aquo hydroxy methylphenylphosphinate are deposited from a solvent such as chloroform to provide an antistatic coating on the polymeric material.

3 Claims, No Drawings

METHOD OF MINIMIZING ACCUMULATION OF ELECTROSTATIC CHARGE ON POLYETHYLENE

The propensity of many substances to accumulate electrostatic charges and its deleterious effect are well known. Natural and synthetic fibers gather electrical charges which hamper spinning and weaving operations. Paper often acquires charges curing printing operations that impair satisfactory deposition of inks. The build up of static electricity on plastic and polymeric materials often results in discomfort for the user and in reduced efficiency as where dust is attracted to photographic film. Where polymeric materials are used to package products such as oxidizing agents and explosives, a sudden discharge of an electrostatic charge can cause a severe explosion.

Reduction of the accumulation of an electrostatic charge has often been attempted in the past by moistening the material. Water has been generally provided in the past from an atmosphere of a controlled humidity or by the application of coatings or deposits which contain or acquire moisture from the atmosphere. Such antistatic agents, however, function poorly in the absence or loss of moisture, and coatings of the same are often removed on contact with water.

It is therefore a principal object of the invention to provide a novel and improved method of coating polymeric substrate materials with an antistatic composition that minimizes the accumulation of electrostatic charges.

It is a further object of the invention to provide a novel and improved method of coating a polymeric substrate material with an antistatic composition which does not require for its effective operation the presence of moisture in the ambient atmosphere.

It is a further object of the invention to provide a novel and improved method of coating a polymeric substrate material with an antistatic composition which is not soluble in water.

Further objects and advantages of the invention will be apparent hereinafter.

In accordance with the invention, various concentrations of polymers of zirconium dihydroxy dibutylphosphinate dioctylphosphinate and chromium aquo hydroxy dibutylphosphate or chromium aquo hydroxy methylphenylphosphinate were mixed in a solvent solution of chloroform. More specifically, residue free coating solutions containing the desired proportions of phosphinate polymers at an initial total concentration of up to 20% but preferably between 6 to 10% weight per volume were prepared by stirring chloroform and the constituents for approximately 12 hours at ambient conditions. Polyethylene plaques 4 inch ×6 inch ×0.004 inch in size were dipped in the solutions, briefly drained, suspended vertically, and air dried away from drafts for approximately 15 minutes. The dip and dry procedure was repeated as often as necessary to obtain uniform coatings of the desired thickness. The finished specimens were stored in a manner to prevent any contact of the coated surfaces until they were electrostatically tested.

The chemical formulas and molecular weight ranges of the preferred metal phosphinate polymers used in the invention are as follows:

| Metal Phosphinate | Chemical Formula | Molecular Weight |
|---|---|---|
| Zirconium dihydroxy dibutylphosphinate dioctylphosphinate | $Zr(OH)_2(OPBu_2O)-(OPOc_2O)$ | 1500 to 10,000 |
| Chromium aquo hydroxy dibutylphosphinate | $Cr(H_2O)\ 2O)_2$ | 5000 to 100,000 |
| Chromium aquo hydroxy methylphenylphosphinate | $Cr(H_2O)\ (OH)(OPMePhO)_2$ | 5000 to 100,000 |

In these formulas, Bu represents a butyl radical, Oc represents an octyl radical, Me represents a methyl radical and Ph represents a phenyl radical.

Specific and preferred embodiments of the method of coating the test samples in accordance with the invention and the electrostatic discharge test results thereof are illustrated by the following examples:

EXAMPLE I 90 grams of zirconium dihydroxy dibutylphosphinate dioctylphosphinate were stirred for 12 hours with 10 grams of chromium aquo hydroxy dibutylphosphinate in a 6% solution of chloroform under ambient conditions. Polyethylene plaques were dipped and air dried until 0.15 mil coatings on each side were obtained. The final coatings were transparent, green and very slightly tacky. In an evaluation of the electrostatic properties of the coating in accordance with a standard Government test procedure in a dry atmosphere, the electrostatic discharge time for a 5 KV charge was 40.4 seconds.

EXAMPLE II 90 grams of zirconium dihydroxy dibutylphosphinate dioctylphosphinate were stirred for 12 hours with 10 grams of chromium aquo hydroxy methylphenylphosphinate in a 6% solution of chloroform under ambient conditions. Polyethylene plaques were dipped and air dried until 0.65 mil coatings on each side were obtained. The final coatings were transparent, green and very slightly tacky. The electrostatic discharge time for the 5 KV charge under the Government test was 19.3 seconds.

It is to be understood that, although the coatings were applied to the plaques herein by a dipping process, the coatings could be applied by brushing, spraying, or any other suitable process without departing from the spirit or scope of the invention.

Similarly, it is to be understood that solvents other than chloroform such as tetrahydrofuran, benzene, and other conventional solvents could be used in the practice of the invention without departing from the spirit or scope thereof.

Obviously, many modifications and variations of the present invention are possible in the light of the above teachings. It is therefore to be understood that within the scope of the appended claims, the invention may be practiced otherwise than as specifically described.

What is claimed is:

1. A method of minimizing the accumulation of an electrostatic charge on polyethylene, said method comprising the steps of:
   a. dissolving two or more poly (metal phosphinates) consisting of zirconium dihydroxy dibutylphosphinate dioctylphosphinate having a molecular weight of 1500 to 10,000 and one or more of the group consisting of chromium aquo hydroxy dibutylphosphinate having a molecular weight of 5000 to 100,000 and chromium aquo hydroxy methylphenylphosphinate having a molecular weight of 5000 to 100,000 in chloroform,
   b. applying a coating of the poly (metal phosphinate) chloroform solution to the polyethylene,
   c. and air drying the coating on the polyethylene.

2. The method of claim 1 wherein the poly (metal phosphinates) are zirconium dihydroxy dibutylphosphinate dioctylphosphinate and chromium aquo hydroxy dibutylphosphinate.

3. The method of claim 1 wherein the poly (metal phosphinates) are zirconium dihydroxy dibutylphosphinate dioctylphosphinate and chromium aquo hydroxy methylphenylphosphinate.

* * * * *